(No Model.)
L. M. PIERRON.
WATER COOLER.
No. 544,518. Patented Aug. 13, 1895.
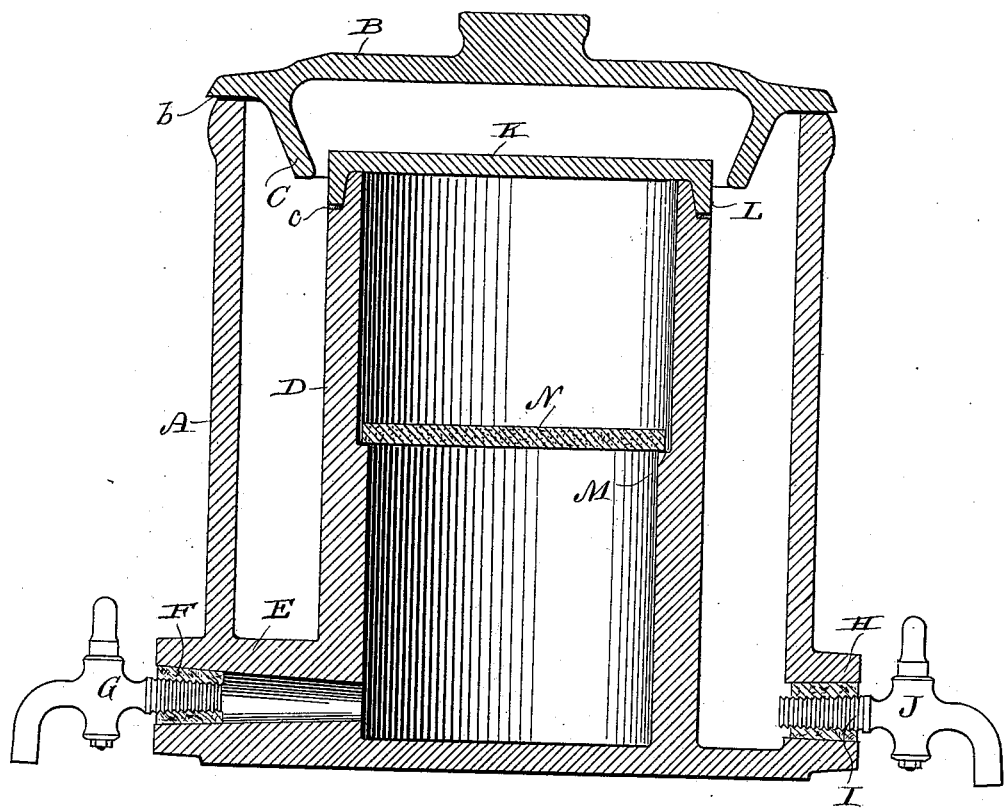
Witnesses
Geo W Loury
N. E. Oliphant
Inventor
Louis M. Pierron,
By H. G. Underwood
Attorney

UNITED STATES PATENT OFFICE.

LOUIS M. PIERRON, OF MILWAUKEE, WISCONSIN.

WATER-COOLER.

SPECIFICATION forming part of Letters Patent No. 544,518, dated August 13, 1895.

Application filed March 18, 1893. Serial No. 466,668. (No model.)

*To all whom it may concern:*

Be it known that I, LOUIS M. PIERRON, a citizen of the United States, and a resident of Milwaukee, in the county of Milwaukee, and in the State of Wisconsin, have invented certain new and useful Improvements in Water-Coolers; and I do hereby declare that the following is a full, clear, and exact description thereof.

My invention has for its object to provide a simple, economical, and effective two-compartment stoneware water-cooler, in which the fluid may be kept in either compartment separate from a cooling medium in the other and readily drawn from either, said invention consisting in certain peculiarities of construction and combination of parts, to be hereinafter described with reference to the accompanying drawing, and subsequently claimed.

The drawing represents a vertical transverse section of a water-cooler constructed according to my invention, and referring to said drawing by letter A represents a glazed and vitrified stoneware vessel, having a cover B of like material, this cover being provided with an inwardly-tapering flange C for the purpose hereinafter specified. To make the cover air-tight when in position, I provide its under side adjacent to the edge with a packing-ring $b$ of rubber or other suitable material. Having its base in common with the vessel is a glazed and vitrified central chamber D, and a conduit E of like material on the base leads from the chamber through the wall of said vessel. The conduit E is engaged by a plug F of cork or other suitable material surrounding the shank of an ordinary faucet G, through which water from the chamber may be drawn, and a hollow boss H on the vessel A, adjacent to the bottom of the latter, receives a plug I surrounding the shank of another faucet J, through which water may be drawn from said vessel. However, it is practical to omit the latter faucet without departure from my invention.

The chamber D has a glazed and vitrified cover K, and, as herein shown, I prefer to provide this cover with a depending flange L that comes flush with the wall of said chamber, the latter being reduced at its upper end to accommodate the cover-flange. To form an air-tight joint between the chamber and its cover, I interpose a packing ring $c$ between the two.

By having the flange C of the vessel-cover B tapered inwardly and of such length as to extend below the upper portion of the cover K on the chamber D, I form a guard that prevents accidental displacement of the latter cover.

The interior of the chamber D has a continuous shoulder M, that constitutes a seat for a horizontal porous tile N through which to filter water poured into said chamber, it being understood that the latter, the conduit E, vessel A, as well as the covers, are non-porous, and that the tile divides the aforesaid chamber into two compartments.

If only moderately cool water is desirable the fluid is placed in the vessel and ice in the chamber, but when a greater degree of cold is desired the reverse is the case, and it is obvious that there can be no intermingling of said water and ice.

The material and construction above specified is a matter of preference, and I desire it understood that various suitable materials may be employed in the manufacture of the cooler, but in any case the outlet from the inclosed chamber extends through the vessel wall, and ice and water are kept apart when said cooler is in use.

Having described my invention, what I claim as new, and desire to secure by Letters Patent, is—

1. A water-cooler comprising a non-porous stoneware chamber having an interior continuous shoulder, a porous tile seated on the shoulder to divide the chamber into two compartments, a non-porous stoneware vessel inclosing said chamber and having a base in common therewith provided with a delivery-conduit leading from the same, and separate covers for the chamber and vessel.

2. A water-cooler comprising a non-porous stoneware chamber having an interior continuous shoulder, a porous tile seated on the shoulder to divide the chamber into two compartments, a non-porous stoneware vessel inclosing said chamber and having a base in common therewith provided with a delivery-conduit leading from the same, a faucet-receiving boss at the bottom of the vessel, and separate covers for the chamber and vessel.

3. A non-porous stoneware water-cooler comprising a chamber and inclosing vessel having a common base provided with a delivery-conduit leading from the chamber through the vessel, a cover having a depending flange that encompasses a reduction at the upper end of the chamber and comes flush with the wall thereof, and a cover for the vessel having an inwardly tapered flange that extends below the top of the chamber-cover.

In testimony that I claim the foregoing I have hereunto set my hand, at Milwaukee, in the county of Milwaukee and State of Wisconsin, in the presence of two witnesses.

LOUIS M. PIERRON.

Witnesses:
N. E. OLIPHANT,
JOHN E. WILES.